United States Patent [19]

Gilli

[11] 3,803,836

[45] Apr. 16, 1974

[54] THERMAL POWER PLANTS AND METHODS FOR OPERATING THE SAME

[75] Inventor: Paul Viktor Gilli, Vienna, Austria

[73] Assignee: Waagner-Biro A.G., Vienna, Austria

[22] Filed: Oct. 4, 1971

[21] Appl. No.: 185,938

[30] Foreign Application Priority Data
Oct. 2, 1970 Austria .................... 8903/70

[52] U.S. Cl. ................................ 60/698
[51] Int. Cl. ........................... F01d 13/00
[58] Field of Search ............ 60/37, 38, 49, 102

[56] References Cited
UNITED STATES PATENTS

| | | | |
|---|---|---|---|
| 3,127,744 | 4/1964 | Nettel .................... | 60/49 |
| 3,358,451 | 12/1967 | Feldman et al. ........ | 60/49 X |
| 3,386,246 | 6/1968 | Sugimura ............... | 60/49 X |
| 3,413,805 | 12/1968 | Heller et al. ........... | 60/49 X |
| 3,495,402 | 2/1970 | Yates .................... | 60/49 X |
| 3,508,399 | 4/1970 | Pacault et al. ......... | 60/49 |

FOREIGN PATENTS OR APPLICATIONS

| | | | |
|---|---|---|---|
| 261,368 | 11/1926 | Great Britain ......... | 60/49 |
| 716,669 | 12/1941 | Germany ............... | 60/105 |

Primary Examiner—Martin P. Schwadron
Assistant Examiner—H. Burks, Sr.
Attorney, Agent, or Firm—Steinberg and Blake

[57] ABSTRACT

A thermal power plant and method of operating the same wherein the plant includes a primary heat source from which steam is delivered through a primary conduit system to a primary power-output. A secondary power-output is driven with steam from an accumulator system. Steam is taken from primary conduit system, at a point between the primary heat source and primary power-output, and is delivered to the accumulator system for superheating the steam delivered by the latter to the secondary power-output.

25 Claims, 5 Drawing Figures

Inventor
PAUL VIKTOR GILLI
BY: Steinberg & Blake
attys

Fig.5

THERMAL POWER PLANTS AND METHODS FOR OPERATING THE SAME

BACKGROUND OF THE INVENTION

The present invention relates to power plants and methods of operating the same.

In particular, the present invention relates to thermal power plants and especially power plants which use nuclear reactors as a heat source with superheated steam being delivered to the power-output such as a turbine.

Thus, the present invention relates to a thermal power plant for supplying superheated steam to a primary power-output structure, and in particular to that type of plant where additional superheated steam is delivered with the use of heat accumulators such as steam or hot-water accumulators, in order to obtain additional power for peak loads, with the invention being particularly applicable to nuclear power plants.

It is already known to derive saturated steam from steam accumulators and to drive steam turbines with this saturated steam. Also, it is known to superheat the saturated steam before it reaches the turbine, and superheating accumulators are used for this purpose. The known steam and superheating accumulators are charged by way of feedwater preheaters or from steam which is tapped off from the system. With this type of charging the pressure level and thus the temperature level which can be reached is limited.

SUMMARY OF THE INVENTION

It is accordingly a primary object of the present invention to provide a power plant and power plant operating method which will avoid the above drawbacks.

Thus, it is an object of the present invention to provide a power plant and power plant operating method according to which it becomes possible to achieve far higher levels of steam pressure and temperatures than could previously be obtained so that more power can be used to drive a secondary power-output from an accumulator system.

It is furthermore an object of the present invention to provide a method and power plant of the above type which do not undesirably increase the cost of the installation by eliminating the need for complex and expensive water-separating devices in connection with the expansion which takes place at the turbine.

It is also an object of the present invention to provide a far higher operating efficiency for the secondary power output system by reducing the amount of moisture in the steam and by utilizing for the secondary power system turbines driven with superheated steam.

It is also an object of the present invention to provide a plant and operating method which will reduce the installation and operating costs particularly by reducing the specific amount of steam which is consumed.

Also it is an object of the present invention to provide a secondary power system which will supplement the primary power system and which at the same time can be brought into operation in a fraction of the time which heretofore was required for this purpose.

Thus, it is a general object of the present invention to provide a nuclear power plant and operating method which will enable peak-load energy to be delivered in an economical manner.

According to the invention a branch conduit means extracts steam from a primary conduit means or from a reactor cooling circuit between a steam generator or boiling-water reactor and a primary power-output means, in the form of a main turbine. This branch conduit means servies to deliver heat energy to an accumulator means. According to a further feature of the invention superheating of the steam from the accumulator means is carried out with steam taken directly or indirectly from a steam conduit which branches from the primary conduit system, and this steam taken from the latter system is either mixed directly with the steam delivered from the accumulator system to the secondary power-output means or the heat from this steam which is branched from the primary conduit means is delivered to the steam delivered from the accumulator to the secondary power-output means by way of a heat-exchanger means and/or a superheater accumulator in an indirect manner.

Thus, in accordance with the method of the invention the heat-exchanger which is used to superheat the steam delivered to the secondary power-output means from the accumulators during discharge of the latter is heated alternately on the one hand with steam taken directly or indirectly by the branch conduit means from the primary conduit means and on the other hand with saturated steam of a higher pressure than the accumulator steam, this saturated steam being taken from a superheating accumulator. According to a further feature of the method of the invention the charging of at least one part of the accumulator system, in particular that which acts as a superheating accumulator, is derived with steam taken from the primary or secondary reactor cooling circuit.

BRIEF DESCRIPTION OF DRAWINGS

The invention is illustrated by way of example in the accompanying drawings which form part of this application and in which.

DESCRIPTION OF PREFERRED EMBODIMENTS

In the several figures the broken lines illustrate those parts of the conduits which are used for charging purposes.

Figure 1:
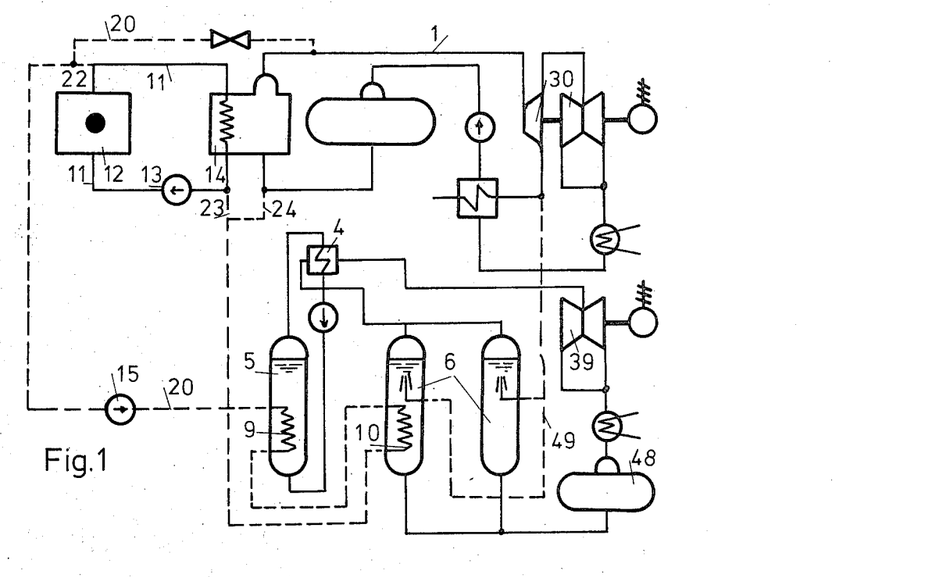
FIG. 1 is a schematic illustration of a power plant and operating method of the invention where the primary heat source is in the form of a reactor operating with water under pressure.

Referring to FIG. 1, there is illustrated therein a primary conduit means 1 which communicates with a steam generator 14 and with a primary power-output means 30, in the form of a turbine, so as to deliver the primary steam from the generator 14 to the primary power-output means 30. The steam generator 14 forms part of a primary heat source means of the illustrated embodiment of the invention.

A branch conduit means 20 communicates with the primary conduit means 1 to extract steam therefrom. This branch conduit means 20 thus takes steam from a location between the generator 14 of the primary heat source and the primary power-output means 30. The branch conduit means 20 delivers the steam extracted from the primary conduit means 1 to an accumulator means which includes the superheating accumulator 5 and the primary accumulators 6. The latter communicate through a secondary conduit means with the secondary power-output means formed by the accumulator turbines 39. This secondary conduit means which connects the accumulators 6 with the secondary power-output means 39 is operatively connected with a heat-exchanger means 4 which serves to superheat the steam flowing from the accumulators 6 to the turbine 39. The turbine 39 communicats with a condenser and condensate container 48.

The branch conduit means 20 includes charging portions 9 and 10 in the form of suitable coils which are situated directly in the liquid within the accumulators 5 and 6. It will be noted that these charging portions 9 and 10 of the branch conduit means 20 are connected in series with each other. The charging pressure of the superheating accumulator 5 is approximately 1.5 to 5 times as great as the charging pressure of the primary accumulator 6. It is to be understood that each tank which forms a superheating accumulator is operatively connected with a plurality of tanks which form primary accumulators.

The charging pressure of the superheating accumulator 5 is as high as or even higher than the pressure in the primary conduit means 1, if charging is provided from the reactor cooling circuit by way of the illustrated conduit 22. The feedwater tank 18 communicates with the steam generator 14 through a conduit which communicates also with a conduit 24 which serves to return the condensate of the steam delivered through the branch conduit means 20 into the circuit upstream of the steam generator 14, so that this condensate is returned to the system ahead of the steam generator 14. Thus, this condensate is mixed with the feedwater delivered to the steam generator 14. However, for certain purposes it may be advantageous to connect the branch conduit means 20 by way of the conduit portion 22 directly with the cooling circuit of the reactor 12, as pointed out above. In this event the return of the condensate of the cooled fluid of the cooling circuit takes place by way of the conduit portion 23 instead of by way of the conduit portion 24, so that in this event the return is directly into the cooling circuit 11 just upsteam of the pump 13 of the cooling circuit between the circulating pump 13 and the steam generator 14. Thus, with this arrangement the conduit portion 22 can deliver the extracted steam to the branch conduit means 20 directly from the cooling circuit 11 at a point thereof located either between the reactor 12 and the steam generator 14 or between the reactor 12 and the pump 13. In order to take care of flow losses, the branch conduit means 20 may be provided with a circulating pump 15.

As was indicated above, the transfer of heat from the superheating accumulator 5 takes place by way of the heat-exchanger means 4 to the steam which is derived from the primary accumulators 6, so that in this way this steam flowing from the primary accumulators 6 is superheated. Instead of charging an accumulator with a coil such as the coil 10, which is an indirect form of charging since the heat transfer takes place through the walls of the coil at the exterior surface of the latter, it is also possible to provide direct charging by delivering the steam from the branch conduit means through suitable nozzles directly into the liquid in the accumulators. The superheating accumulator 5 is designed for constant pressure discharge operation. It is filled with hot water or in some cases with a liquid having a high boiling point such as difenyl, terphenyl, parrafin, oil, or liquid metal, so that the tank which forms the accumulator 5 can have a wall structure designed for low-pressure operation.

The charging of the accumulators 6 can take place either from the superheating accumulator 5 or by way of a charging conduit 49 directly from the turbine 30 with a suitable moisture separator connected into this conduit system, or it is possible to charge the primary accumulators 6 with preheated feedwater from the primary circuit.

As is apparent from FIG. 1 the steam of the secondary power-output means 39, after operating the latter, passes through a suitable heat-exchanger so as to extract heat from the steam, and it is then received in a tank 48 from which the condensate is delivered by a suitable pump into the lower ends of the accumulators 6. On the other hand, the superheating accumulator 5 forms part of a closed circuit with the superheated steam of this accumulator traveling through the heat-exchanger means 4 so as to condense while giving up its heat to the steam derived from the main accumulators 6, and then this condensed steam of the closed circuit of the superheated accumulator 5 is circulated back to the latter by way of the pump illustrated in FIG. 1. Thus, the steam flowing from the accumulators 6 will be superheated at the heat-exchanger means 4 before reaching the power-output means 39, and from the latter the condensate is returned back to the accumulators 6. In the same way the steam from the primary power-output means 30 is circulated back to the feedwater tank 18, and the tanks 18 as well as 48 are provided at their entrance ends with suitable structures for separating the fluid into its gaseous and liquid phases. Also, as is schematically shown in FIG. 1, steam from the turbine 30 is sued to deliver heat through suitable superheaters so that the heat energy is further utilized.

Figure 2:
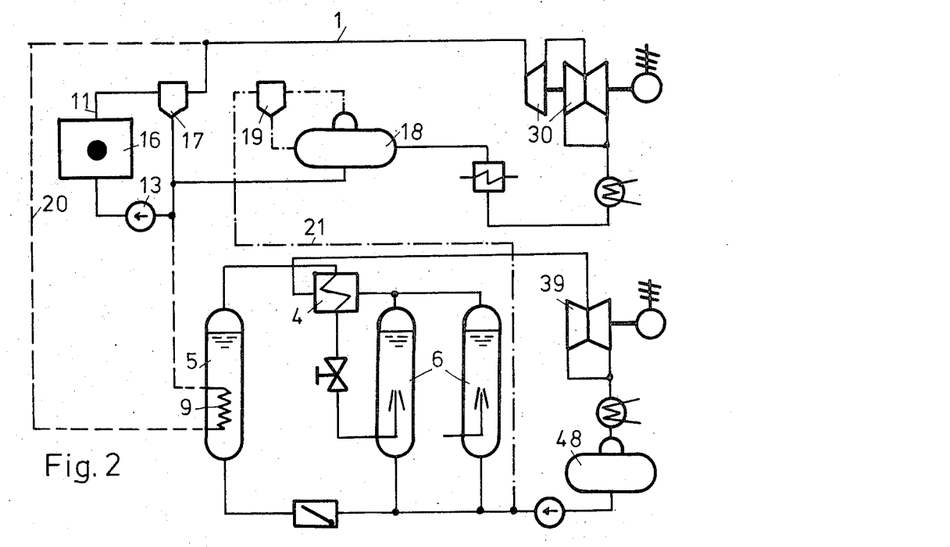
FIG. 2 schematically illustrates the plant and method of the invention as applied to an installation where the reactor operates in connection with boiling water of a suitable boiler.

Referring to FIG. 2, the embodiment of the invention which is illustrated therein is similar to that of FIG. 1 with the changes referred to below. The reactor 16 of FIG. 2 differs from the reactor 12 of FIG. 1 in that the latter reactor operates with water under pressure whereas the reactor 16 operates with boiling water so that this reactor 16 itself acts as a steam generator. This plant also has a cooling circuit 11 provided for the reactor installation 16, and the circuit 11 is provided with a phase separator 17 for separating the fluid in the cooling circuit 11 into its liquid and gaseous phases. The branch conduit means 20 communicates in the embodiment of FIG. 2 with a part of the primary conduit means 1 extending between the phase separator 17 and the primary power output means 30. This branch conduit means 20 has the charging portion 9 in the form of a suitable coil which serves for indirect charging of the superheating accumulator 5 with the heat of the steam in the branch conduit means 20. It is possible, however, to connect the branch conduit means 20 to a part of the conduit 11 between the reactor 16 and the phase separator 17 or between the reactor 16 and the pump 13, the conduit 1 still remaining connected to the phase separator 17. After the liquid separated in the separator 17 has been augmented with liquid from the feedwater tank 18 it is pumped by the circulating pump 13 again into the reactor 16. The indirect charging of the superheater accumulator 5 by way of the heating surfaces of the coil 9 prevents contamination of the accumulator installation with radioactive materials.

The steam which is formed in the accumulators 6 of FIG. 2 is superheated at the heat-exhanger means 4 and flows from the latter to the secondary power-output means 39. The steam from the superheating accumulator 5 condenses during discharge in the heat-exchanger means 4, and in order to maintain the heating costs as low as possible the condensate is delivered to the primary accumulators 6.

Furthermore, in order to reduce the volume of the space which must be occupied by the structure, and in particular in order to reduce the space occupied by the feedwater tank 18, individual accumulators 6 may be connected by way of a conduit 21 with the feedwater tank 18, these accumulators 6 which are connected through the conduit 21 with the tank 18 being either in discharged or charged condition and thus serving as reserve feedwater tanks. The conduit 21 delivers the fluid to a flash tank 19 in which the pressure of the fluid is permitted to drop with the separated water flowing directly into the tank 18 while the steam resulting from the drop in pressure reaches the tank 18 after passing through a degasser (deaerator).

It will be noted that with the embodiment of FIG. 2, the accumulators 6 not only communicate with the pump delivering the water from the tank 48 but also communicate with the superheating accumulator 5, so that liquid in all of the accumulators is maintained at the desired level.

Figure 3:
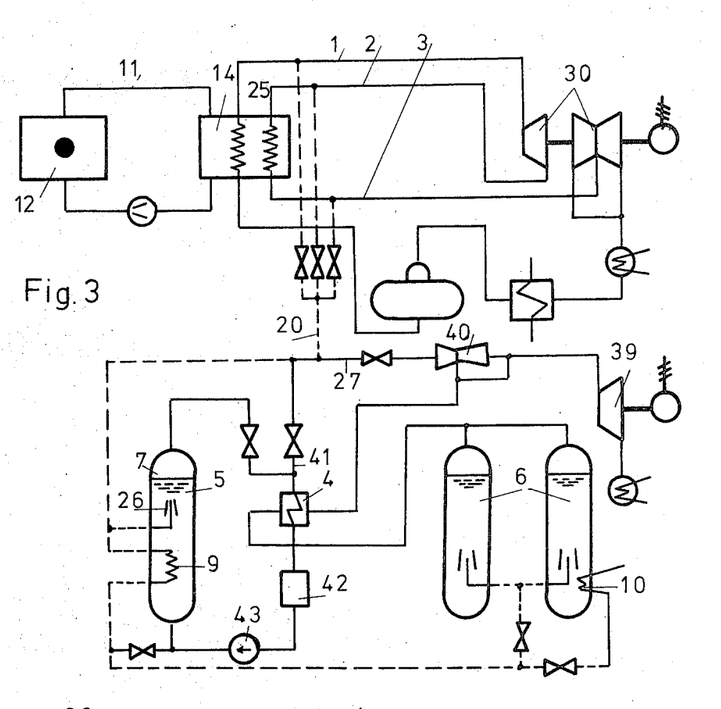
FIG. 3 illustrates another embodiment of the plant and method of the invention, with FIG. 3 schematically showing a nuclear power plant installation where the accumulator system is connected to a steam circuit of a reactor cooled, for example, with gas or with liquid metal, particularly a fast breeder reactor.

FIG. 3 schematically illustrates a further embodiment of the invention which is a further development of the arrangement shown in FIG. 1. In this embodiment the cooling circuit 11 of the reactor 12, in which cooling takes place particularly with gas of relatively high temperature or with liquified metal, is provided with a steam generator 14 which has a secondary or intermediate heater 25. The steam generator 14 is connected with the conduit 1 as well as with conduits 2 and 3, which are connected to the secondary heater 25, so that in this embodiment the primary conduit means is formed by the conduits 1-3. The branch conduit means 20 for delivering heat from the primary conduit means 1-3 to the superheating accumulator means 5 may be selectively connected through the schematically illustrated valves with any of the conduits 1-3 of the primary conduit means. This superheating accumulator 5 can be indirectly charged by way of the coil 9 or it may be directly charged by way of the charging nozzle 26. The steam which is not used for charging the superheating accumulator 5 or which cools in the coil 9 is used for charging the accumulators 6. These accumulators 6 also may be charged directly or indirectly. Thus it is possible to provide for one or more of the accumulators 6 an indirect charging coil 10 or charging may take place directly through the illustrated nozzles. In the event that only one of the accumulators 6 is provided with a coil 10 then suitable connecting conduits are provided so that all of the accumulators 6 are uniformly charged.

The steam from the primary accumulators 6 is superheated in the heat-exchanger means 4 and then reaches the secondary power-output means 39. The condensate from the latter may be returned to the accumulators in the manner described above. In this embodiment the superheating accumulator 5 operates with a variable pressure and is provided with a steam chamber 7. The condensate of the steam from the superheating accumulator 5, after passing through the heat-exchanger means 4, is collected in a tank 42 and recirculated by way of the pump 43. The unit 42 takes the form of a suitable steam trap or steam separator.

Especially during the last phase of the discharge of the superheating accumulator 5 is a steam conduit 27 brought into operation so that the steam from the accumulators 6 can be superheated with steam from the primary conduit means 1-3. For this purpose the conduit system is provided with corresponding throttling devices. An injector 40 may be used with advantage, this ejector serving to increase the pressure of the steam delivered to the secondary power-output means 39. Furthermore, there is the possibility of superheating the steam delivered to the secondary power-output means 39 with the aid of steam from the conduits 20 and 41 and from the heat-exchanger means 4. Toward the end of the discharge of the accumulators 6 it is of advantage to discharge also the superheating accumulator 5 down to the discharge pressure of the primary accumulators 6. This can take place, for example, by way of the conduits 41 and 27 and also, if desired, by way of the ejector 40.

Figure 4:
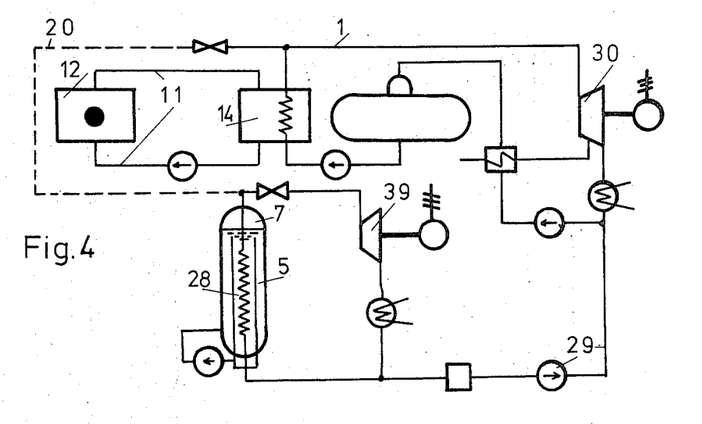
FIG. 4 schematically illustrates the invention in connection with a thermal accumulator filled with a liquid which has a high boiling temperature.

In the embodiment of the invention which is illustrated in FIG. 4 the superheated accumulator 5 is filled with a liquid which has a high boiling temperature, such as, for example, diphenyl, terphenyl, parrafin, oil, or in some cases a liquid metal. The charging of the accumulator takes place from the branch conduit means 20 which is in communication with the primary conduit means 1, so that the coil or charging portion 28 of the branch conduit means 20, which is situated in the interior of the superheating accumulator 5, will indirectly heat the fluid in the latter. In this embodiment the superheating accumulator 5 also serves as the steam generator which provides the steam used to operate the secondary power-output means 39. The steam from the branch conduit means 20 which cools in the coil 28 during charging of the superheating accumulator 5 is received in a conduit 29, provided with a suitable circulating pump, so that in this way the charging fluid is recirculated back to the primary power-output system. The generation of steam in the accumulator 5 of this embodiment takes place in the manner similar to a through-flow steam generator where in one pass the feedwater is heated, vaporized and superheated. It is also possible, hwever, to use circulating systems having a preheater, circulating vaporizer, and superheater, preferably in connection with separate accumulator tanks and with different liquids adapted to the particular temperature levels. The accumulator liquids are transported partly by way of circulating pumps around or through the heat-exchanging surfaces.

In connection with FIG. 4 it will be noted that the condensate from the secondary power-output means 39 is also delivered by way of the conduit 29 back into the primary system. The liquid within the superheating accumulator 5 of FIG. 4 is continuously recirculated in a closed path as illustrated. Prior to operation of the secondary power-output means 39 the communication of the latter with the branch conduit means 20 is interrupted by way of the valve illustrated in FIG. 4 just upstream of the turbine 39 between the latter and the portion of the conduit 20 which forms the charging coil 28. Thus, prior to operation of the turbine 39, the charging of the superheating accumulator 5 will take place so that it will be brought to the desired operating conditions prior to operation of the turbine 39. Then when the latter is operated upon opening of the valve the heat which is stored in the accumulator 5 will be used to provide the turbine 39 with the required operating steam, and part of this steam also will be derived directly from the branch conduit means 20 during discharge of the accumulator 5.

Figure 5:
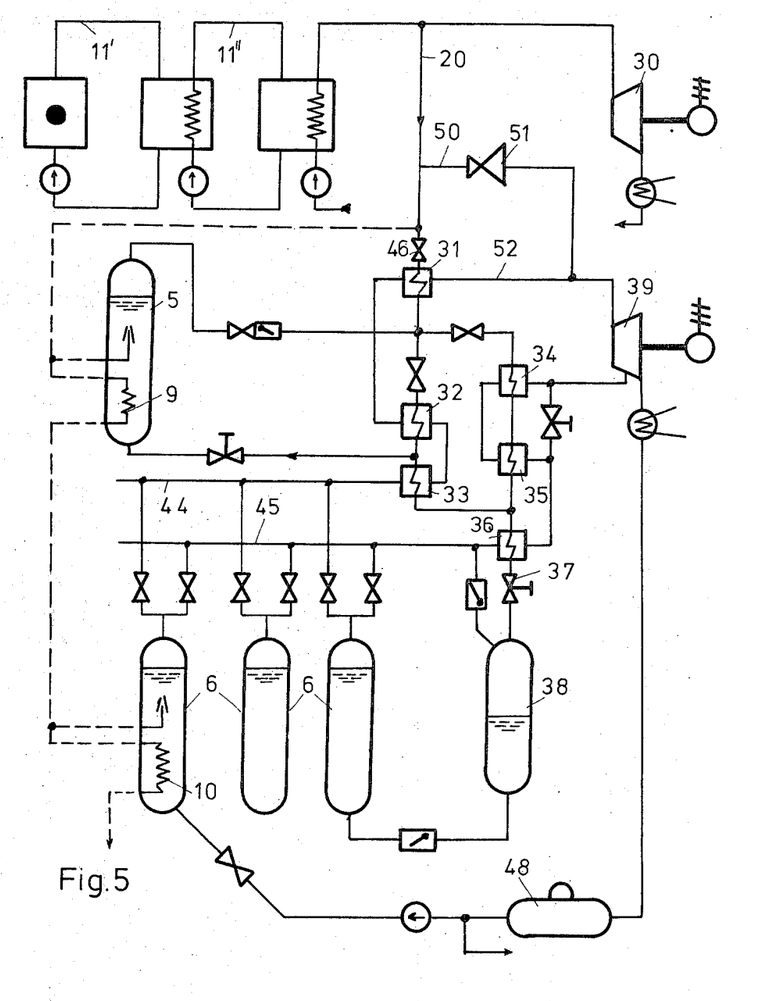
FIG. 5 illustrates a particular form of the installation of FIG. 3.

FIG. 5 schematically illustrates an installation similar to that of FIG. 3. The primary heat source means of this embodiment includes a pair of cooling circuits 11' and 11" connected one after the other, as is conventional for reactors cooled with liquid metal. The illustrated installation provides superheating with steam from the primary conduit means used to deliver driving steam to the primary power-output means 30, and this steam taken from the primary conduit means and used for superheating purposes cools and condenses while heat is transferred therefrom. A larger number of primary accumulator tanks are selectively connected to a pair of conduits or headers 44 and 45. The conduits 44 and 45 form the secondary conduit means which serves to deliver the steam from the accumulators 6 to the secondary power-output means 39. The conduit 44 which operates at a higher pressure delivers the steam to the steam inlet of the turbine 39 while the conduit 45 which operates at a lower pressure delivers the steam from the accumulator 6 through an additional valve of the turbine at a suitable pressure into an intermediate part of the turbine as illustrated. The several primary accumulators 6 are discharged either sequentially or in groups in such a way that first the conduit 44 is provided with steam at relatively high pressure and then the conduit 45 is provided with steam at the lower pressure. Of course it is also possible to provide more than a pair of headers 44 and 45.

The superheating of the steam taken from the accumulators 6 takes place for both of the steam circuits which are at different pressures partly in separate heat exchangers 31-33 and 34-36, the latter coacting with the lower pressure conduit and the former with the higher pressure conduit 44. Because of the pressure drops which take place in these heat exchangers they are adapted to the different pressures of the steam flowing from the accumulators 6. The unthrottled steam delivered from the branch conduit means 20 directly from the primary conduit means flows through a check valve 46 first through the heat exchanger 31 which acts to cool the steam in the conduit 20. Because this heat exchanger 31 superheats the steam from the accumulators 6 to the greatest extent where the steam has the highest pressure it is connected into the circuit as the final heat exchanger in the series of heat exchangers which coact with the steam from the accumulators 6. The next heat exchangers 32 and 34 act as condensers while the following heat exchangers 33 and 35 act as condensate coolers, and the steam from the accumulators 6 flows through the heat exchangers 32-35 in countercurrent into the flow of steam in the branch conduit means 20. Because the steam is delivered from the accumulators 6 in two pressure stages the several heat exchangers take the form of the illustrated separate units. However, those heat exchangers which belong to one pressure stage can be situated within a common housing.

In the illustrated example, a further condensate subcooler 36 is provided only in connection with the lower pressure stage of the conduit 45 where the steam has a correspondingly lower saturation temperature. Just downstream of the condensate subcooler 36 is a primary reducing valve 37 which may, if desired, be located just upstream of the condensate subcooler 36. Then the condensate is delivered to that particular accumulator 6 which at the particular instant is connected to the lower pressure stage. However, it is also possible as shown in FIG. 5 to deliver the condensate to a flash tank 38 in which the pressure drops and from which the generated steam is returned to the low-pressure header 45. Individual superheating stages, in particular those for the lower pressure system, can be provided with bypasses 47 which can be used particularly toward the end of the discharge operation so that while accepting a drop in the steam temperature after mixing the pressure loss in the superheaters 34 and 35 can be diminished by partially admitting steam thereto.

The superheater accumulator 5 of FIG. 5 has a pressure substantially higher than that of the accumulator tanks 6. The superheating accumulator 5 may be connected with the superheaters 32-36 through the illustrated valves in order to superheat the steam from the accumulator 6 in a manner which is alternative to the superheating of the steam from the accumulator 6 with the steam flowing through the branch conduit means 20 directly through these superheaters in the manner described above. This alternative superheating of the steam from the accumulators 6 with the steam derived from the superheating accumulator 5 can take place advantageously for short periods of absolute peak power-output when the extraction of steam directly from the primary power-output system is interrupted. Since the superheating accumulator 5, for reasons of economy of operation, is used toward the end of the discharge in connection with the supply of steam for the steam turbine 39, the system of FIG. 5 is of particular advantage in connection with this final period of operation since during this last time period the superheating takes place with steam from the primary conduit means of the primary system. On the other hand, the superheating with the steam from the primary system can also take place in an economical manner at the beginning of the discharge of the primary accumulator 6, since in this event because of the high accumulator pressure and in order to bring about a rapid drying and heating of the conduits and turbine, a relatively high superheating temperature is available which is easily possible with steam branched directly from the primary conduit means but which could be achieved with the superheating accumulator only with difficulty and with a high installation cost. Thus, the discharge of the superheating accumulator 5 can be limited, for example, to the intermediate period of a discharge which for the most part coincides with the peak load (so-called triangular discharge), so that the superheating with the steam directly branched from the primary conduit means can take place at the beginning and toward the end of the discharge operations. It is also naturally possible and according to the particular operating conditions of the installation economical to eliminate entirely the superheater 5 and to bring about superheating during the entire discharge interval by way of steam directly delivered by way of the branch conduit means 20 from the primary conduit means, and of course such a system would be simplified with respect to that described above and shown in FIG. 5.

The operation of heat exchangers 31–36 by way of the branch conduit means 20 with steam directly from the primary conduit means can take place with the resulting condensate delivered by way of the conduits 53 and 54 to the accumulators 5 and 6, respectively.

The system illustrated in FIG. 5, particularly in connection with the accumulators 6 which can be discharged sequentially or in groups has moreover the advange that the condensate tank 48 can be maintained at a relatively small size. Thus, the condensate from the turbine 39 need only be taken from the latter until the first accumulator 6 is completely discharged. Then the condensate is pumped into this discharged accumulator where the water level has correspondingly dropped and after the discharge of the next accumulator 6 the condensate can be delivered to the latter accumulator, and so on, so that the capacity of the tank 48 can be relatively small. Of course, this type of operation assumes the fact that the charging of the accumulators 6 takes place at least in part in an indirect manner, such as by way of the coils 9 and 10 illustrated in FIG. 5 for providing charging with steam taken directly or indirectly from the primary power system.

Between the branch conduit means 20 and the conduit 52 which supplies steam to the turbine 39 there is an interconnecting conduit 50 provided with a reducing means 51 located at a suitable reducing station. Through this interconnecting conduit 50 it is possible upon failure of the assembly which forms the turbine installation 30 to deliver operating steam directly to the turbine 39 without any delay, so that this secondary power-output means formed by the turbine 39, even when the accumulators are discharged, can be operated in a manner according to which it serves as a reserve turbine to replace the turbine 30 when necessary. In the event that there is, as shown in FIG. 3, an intermediate superheater, then the connection can also take place at the additional conduits 2 and 3.

In all of the above-described embodiments of the invention the superheating accumulator 5 has been described as containing a liquid. However, it is also possible to construct this accumulator in the form of a container which has solid heat-transferring bodies in its interior, since it is possible to situate in the interior of the accumulator metal bodies of all types, such as, for example, balls, plates, wires, or woven wire. These materials during charging with the charging steam are engaged by the hot steam which flows through and around all these materials so as to store heat in the latter for charging purposes and this heat is given up during discharge to the steam from the accumulators 6. Of course, with this type of construction the indirect charging by way of coils 9 will be eliminated.

It is also possible to make use of the present invention when the function of the accumulator turbine 39 together with the accessories thereof such as condensers and the like is taken over in part or entirely by the main power-output turbine 30, which in this event will additionally receive steam from the accumulators 6. With this type of construction the turbine 30 is constructed so that it can operate under overload conditions.

The most important advantages achieved with the present invention, as compared to the present state of the art, resides in the superheating or greater superheating of the accumulator steam. This brings about a reduction in the moisture content at the turbine outlet and makes possible in this way the use of higher pressure for the accumulator steam without complex and expensive liquid-separating units arranged in the path along which expansion takes place in the turbine. The reduction in the moisture content on the one hand and the superheating on the other hand brings about in addition a sharp improvement of the turbine efficiency as well as an increase in the available temperature drop in the turbine. All of these results produce a sharp reduction in the specific steam consumption, and thus a saving in the installation and operating costs. The superheating or increased superheating brings about furthermore an additional variable which can be regulated according to a series of reference points and which can have the best possible value for each phase of discharge of the primary accumulators 6, so that the cost for superheating and the results achieved thereby are always maintained in the best possible relationship. It should also be noted that by way of the increased superheating the starting time for achieving the required steam from the accumulators to be delivered to the turbine is reduced since the conduits and turbine are more rapidly heated. As a result a smaller amount of condensate is produced. The invention provides particular advantages in connection with the economy of the operation so that nuclear power plants can be economically suited for the supply of peak power.

The use of the fresh or intermediate steam directly from the primary power system for superheating at the time of the peak requirements when the discharge of the steam accumulators take place also provides a great and all-important advantage in that in this way the output of the primary turbine, as a result of the branching off of steam therefrom by way of the branch conduit means, is somewhat reduced because in this case the entire reactor output is no longer used to provide energy at the primary turbine 30. The output of the secondary power-output means 39 however is increased as a result of superheating to an extent which is much greater than the reduction in the output of the primary turbine 30. This results from the fact that the steam directly introduced from the primary heat source means into the primary turbine 30 even at high steam temperatures can be used because of condenser losses only with a total operating efficiency which at a maximum is approximately 40 percent. By superheating the accumulator steam which has a correspondingly lower pressure, the condensation heat of the steam taken from the primary system and even in part the liquid heat of the condensate are used particularly in the last time period of the discharge of the accumulator tanks, so that even with the average operating efficiency of the turbine 39 the use of the additional superheating heat takes place in the accumulator circuit to an extent muct greater than in the primary circuit. As a result there is the important effect that by superheating the accumulator steam with the corresponding reduction in moisture content in the accumulator steam the turbine operating efficiency is very substantially increased so that the effective use of the superheating heat takes place at the rate of 70, 80 and more percent. The increase in the steam temperature is also of importance for the accumulator turbine 39 in that the discharge steam moisture becomes unacceptably high without superheating. The theoretical power reduction of the primary turbine is on the order of one or a few percent according to the relative power of the accumulator turbine and the extent of superheating of the accumulator steam, and in practice these factors may be compensated partly or entirely by suitable construction or connection measures, and in some cases also by providing smaller accumulator tanks in the accumulator circuits or by using the reserve built into the reactor and the circulating devices. Moreover, the turbines, generators and condensers are designed for this somewhat smaller power so as to save costs, since at the time of peak power demand the auxiliary or secondary turbine 39 is in operation and in most cases for the purposes of charging the accumulators there is a sufficient time available when the power requirements are low.

What is claimed is:

1. In a thermal power plant, primary power-output means and secondary power-output means both of which are steam-driven, primary heat source means for providing a primary source of heat, primary conduit means communicating with said primary heat source means and said primary power-output means for conveying steam from said primary heat source means to said primary power-output means to drive the latter, accumulator means communicating with said secondary power-output means for delivering driving steam thereto, and branch conduit means communicating with said primary conduit means between said primary heat source means and said primary power-output means and with said accumulator means for deliverying to the latter heat from said primary heat source means, said accumulator means providing steam for said secondary power-output means primarily with heat derived from said branch conduit means, said primary power-output means, primary heat source means, and primary conduit means forming a primary power system hile said accumulator means and secondary power-output means form a secondary power system, and both of said power systems utilizing for a generation of power at both of said power-output means a single fluid which is the same for both systems, and both of said systems communicating at least partly with each other for intermingling the fluid of both systems.

2. The combination of claim 1 and wherein said accumulator means includes at least one accumulator having in its interior a liquid which is in heat-exchange relation with respect to said branch conduit means for providing in said one accumulator steam for superheating the steam delivered to said secondary power-output means for driving the latter.

3. In a thermal power plant, primary power-output means and secondary power-output means both of which re steam-driven, primary heat source means for providing a primary source of heat, primary conduit means communicating with said primary heat source means and said primary power-output means for conveying steam from said primary heat source means to said primary power-output means to drive the latter, accumulator means communicating with said secondary power-output means for delivering driving steam thereto, and branch conduit means communicating with said primary conduit means between said primary heat source means and said primary power-output means and with said accumulator means for delivering to the latter heat from said primary heat source means, said accumulator means providing steam for said secondary power-output means at least in part with heat derived from said branch conduit means, said accumulator means including at least one accumulator in heat-exchange relation with said branch conduit means for providing superheated steam and at least a second accumulator and secondary conduit means communicating with said second accumulator and secondary power-output means for supplying steam to the latter for driving the same, heat-exchanger means operatively connected on the one hand with said one accumulator and on the other hand with said secondary conduit means for superheating steam in the latter with superheated steam from said one accumulator, and return conduit means communicating at least indirectly with said heat-exchanger means for receiving therefrom condensate of the steam derived from said one accumulator and for returning the condensate back to said primary heat source means.

4. The combination of claim 1 and wherein said branch conduit means includes a charging portion coacting with said accumulator means for at least indirectly charging said accumulator means.

5. The combination of claim 1 and wherein a secondary conduit means communicates with said accumulator means and said secondary power output means for delivering superheated steam to the latter, and heat-exchanger means coacting with said branch conduit means and secondary conduit means for superheating the steam delivered by said secondary conduit means to said secondary power-output means with steam in said branch conduit means.

6. The combination of claim 5 and wherein said heat-exchanger means includes a plurality of heat-exchanging units situated along said branch conduit means and said secondary conduit means for superheating the steam delivered by said secondary conduit means to said secondary power-output means while condensing the steam of said branch conduit means.

7. The combination of claim 6 and wherein said branch conduit means is provided downstream of said plurality of heat-exchanging units with a reducing valve means for reducing the pressure in said branch conduit means approximately to the pressure of the steam supplied by said secondary conduit means to said secondary power-output means.

8. The combination of claim 7 and wherein a phase-separating means communicates with said reducing valve means for separating the fluid flowing beyond the latter into liquid and gaseous phases.

9. In a thermal power plant, primary power-output means and secondary power-output means both of which are steam-driven, primary heat source means for providing a primary source of heat, primary conduit means communicating with said primary heat source means and said primary power-output means for conveying steam from said primary heat source means to said primary power-output means to drive the latter, accumulator means communicating with said secondary power-output means for delivering driving steam thereto, and branch conduit means communicating with said primary conduit means between said primary heat source means and said primary power-output means and with said accumulator means for delivering to the latter heat from said primary heat source means, said accumulator means providing steam for said secondary power-output means at least in part with heat derived from said branch conduit means, a secondary conduit means communicating with said accumulator means and said secondary power output means for delivering superheated steam to the latter, and heat-exchanger means coacting with said branch conduit means and secondary conduit means for superheating the steam delivered by said secondary conduit means to said secondary power-output means with steam in said branch conduit means, said secondary conduit means including a pair of separate conduits for supplying steam at different pressures to said secondary power-output means, and a pair of groups of heat-exchanging units forming said heat-exchanger means and coating with said pair of conduits of said secondary conduit means for superheating the steam thereof with the steam of said branch conduit means.

10. The combination of claim 5 and wherein the steam of said secondary conduit means flows through said heat-exchanger means in countercurrent to the flow of steam through said branch conduit means.

11. The combination of claim 2 and wherein a secondary conduit means communicates with said accumulator means and with said secondary power-output means for delivery to the latter steam from said accumulator means, and said branch conduit means also communicating with said secondary conduit means for further heating steam therein and for adding the steam thereto.

12. The combination of claim 2 and wherein the steam delivered to said secondary power-output means is formed directly in said one accumulator.

13. The combination of claim 12 and wherein the liquid within said accumulator is a liquid having a high boiling temperature selected from the group consisting of diphenyl, terphenyl, paraffin, and oil.

14. The combination of claim 12 and wherein an extension of said branch conduit means is in the form of a coil situated directly within said one accumulator, and said coil communicating directly with said secondary power-output means.

15. The combination of claim 1 and wherein said accumulator means has a portion containing solid bodies which are in heat-exchanging relation with part of said branch conduit means for receiving therefrom heat for superheating steam delivered to said secondary power-output means.

16. In a thermal power plant, primary power-output means and secondary power-output means both of which are steam-driven, primary heat source means for providing a primary source of heat, primary conduit means communicating with said primary heat source means and said primary power-output means for conveying steam from said primary heat source means to said primary power-output means to drive the latter, accumulator means communicating with said secondary power-output means for delivering driving steam thereto, and branch conduit means communicating with said primary conduit means between said primary heat source means and said primary power-output means and with said accumulator means for delivering to the latter heat from said primary heat source means, said accumulator means providing steam for said secondary power-output means at least in part with heat derived from said branch conduit means, said branch conduit means including a charging portion coacting with said accumulator means for at least indirectly charging said accumulator means, said accumulator means including at least a pair of accumulators one of which is a superheating accumulator and the other of which provides the steam which is delivered to said secondary power-output means and a heat-exchanger means operatively connected with both of said accumulators for heating the steam from said other accumulator with steam from said one accumulator, said accumulators respectively containing in their interiors heating coils connected in series with each other and with said branch conduit means.

17. The combination of claim 1 and wherein said primary heat source means is a boiling-water reactor and includes a phase-separating means operatively connected with said reactor, and said branch conduit means communicating with said phase-separating means downstream of said accumulator means for returning fluid to said reactor after utilizing the heat of the fluid in said branch conduit means at said accumulator means.

18. In a thermal power plant, primary power-output means and secondary power-output means both of which are steam driven, primary heat source means for providing a primary source of heat, primary conduit means communicating with said primary heat source means and said primary power-output means for conveying steam from said primary heat source means to said primary power-output means to drive the latter, accumulator means communicating with said secondary power-output means for delivering driving steam thereto, and branch conduit means communicating with said primary conduit means between said primary heat source means and said primary power-output means and with said accumulator means for delivering to the latter heat from said primary heat source means, said accumulator means providing steam for said secondary power-output means at least in part with heat derived from said branch conduit means, said accumulator means including at least one accumulator having in its interior a liquid which is in heat-exchange relation with respect to said branch conduit means for providing in said one accumulator steam for superheating the steam delivered to said secondary power-output means for driving the latter, said accumulator means including a second accumulator and a secondary conduit means extending from said second accumulator to said second power-output means for delivering steam thereto, and heat-exchanger means operatively connected with said secondary conduit means and said one accumulator for superheating steam in said secondary conduit means with heat derived from said one accumulator of said accumulator means.

19. The combination of claim 2 and wherein said branch conduit means provides at said one accumulator a charging pressure equal to that in said primary conduit means.

20. The combination of claim 2 and wherein a feedwater means communicates with said primary heat source means for delivering feedwater thereto, and conduit means extending from said accumulator means to said feedwater means for delivering to the latter liquid from said accumulator means so that the latter serves as a reserve feedwater container means.

21. The combination of claim 1 and wherein a secondary conduit means extends from said accumulator means to said secondary power-output means for delivering steam to the latter, and second branch conduit means communicating with said secondary conduit means and one of the other conduit means and carrying a reducing means, so that through said reducing means and second branch conduit means steam in said secondary conduit means is further heated.

22. In a method of operating a power plant, the steps of extracting part of the steam flowing from a primary heat source to a primary power-output means, placing the thus-extracted steam in heat-exchanging relation with steam flowing from an accumulator means to a secondary power-output means, so as to cool the extracted steam, condensing the thus-cooled steam, and then returning the condensate to the accumulator means.

23. In a method for operating a power plant, the steps of extracting part of the steam flowing from a primary heat source to a primary power-output means, directing at least part of the extracted steam through a superheating accumulator for achieving superheated steam from the latter, delivering steam from at least a second accumulator to a secondary power-output means, and placing the thus-delivered steam alternatively in heat-exchanging relation with the extracted steam and with steam from said superheating accumulator, to heat the steam delivered from the second accumulator to the second power-output means, said superheating accumulator providing steam at a pressure greater than that delivered from the second accumulator to the secondary power-output means.

24. In a method of operating a power plant which has a plurality of reactor-cooling circuits, the step of charging an accumulator with heat derived from one of said circuits, the heat derived from said one cooling circuit being used first for charging one accumulator and then for charging a second accumulator, said one accumulator being used for superheating steam while the second accumulator is used for generating the steam which is superheated.

25. In a method of operating a power plant, the steps of operating a primary power-output means with steam derived from a primary heat source, extracting part of the steam from the primary heat source upstream of the primary power-output means and utilizing the extracted steam for charging an accumulator from which heat is derived for operating a secondary power-output means, and in the event of failure of the primary output-means utilizing steam from the primary heat source to drive the secondary power-output means after reducing the pressure of the steam from the primary heat source.

* * * * *